July 10, 1962  E. J. HEITZMAN  3,043,630
AIR COOLED BRAKE DRUM

Filed Sept. 3, 1958  3 Sheets-Sheet 1

INVENTOR.
Edward J. Heitzman
BY
D. C. Staley
His Attorney

July 10, 1962 E. J. HEITZMAN 3,043,630
AIR COOLED BRAKE DRUM
Filed Sept. 3, 1958 3 Sheets-Sheet 2

INVENTOR.
Edward J. Heitzman
BY
D. C. Staley
His Attorney

July 10, 1962 E. J. HEITZMAN 3,043,630
AIR COOLED BRAKE DRUM

Filed Sept. 3, 1958

INVENTOR.
Edward J. Heitzman
BY
His Attorney

3,043,630
Patented July 10, 1962

**3,043,630
AIR COOLED BRAKE DRUM**
Edward J. Heitzman, Utica, Mich., assignor to General Motors Corporation, Detroit, Mich., a corporation of Delaware
Filed Sept. 3, 1958, Ser. No. 758,773
3 Claims. (Cl. 301—6)

This invention relates to a vehicle brake drum and more particularly to a means for cooling a vehicle wheel and brake drum.

Vehicle wheels of the present day automobile are becoming of a smaller diameter and a larger tire size. The speed and weight of the present day automobile are also increasing. These factors create a problem in designing a braking structure which will give adequate braking and also provide sufficient cooling of the dissipated heat within the braking structure. A fluid system for cooling necessitates the use of fittings and circulating means for the fluid system. A simple and positive cooling means can be devised employing circulation of air as a cooling medium.

It is an object of this invention to provide a unitary cast wheel and brake drum with air cooling means with a vehicle braking system.

It is another object of this invention to provide heavy walls within the inner periphery forming the brake drum within the wheel for absorbing and storing the dissiptaed heat during braking of the vehicle wheels and also a means for conducting this heat to a large surface or radiating area such as passage walls for cooling the brakes.

It is a further object of this invention to provide a centrifugal air pump within the unitary casting of the wheel and drum structure which is provided with air ducts passing through the heated area within the brake drum.

It is a further object of this invention to employ impeller vanes within the rim structure for rapidly conducting the heat to the external surface of the vehicle wheel and thereby provide a large area for cooling the dissipated heat within the wheel structure surrounding the passages within the wheel rim. The rapid conduction also provides a means for a more nearly uniform temperature throughout the wheel structure.

It is a further object of this invention to provide tire mounting flanges sealed to the outer periphery of the rims. The unitary casting of the wheel and the brake drum is proposed to be of a light-weight metal having a high specific heat and the rim or tire mounting flange which is mounted about the outer periphery of the wheel to be constructed of a metal of lower conductivity thereby providing a cooler mounting surface for the tires.

It is a further object of this invention to provide in a modification of this invention passages between the rim and drum section of the wheel inclined in a forward direction of rotation with an axial line.

The objects of this invention are accomplished by means of a unitary casting which includes the wheel mounting or hub section and a radially extending wall for supporting the rim section. This radial wall is provided with radially extending passages which have inlet ports on the inboard side of the wheel structure. As the passages extend radially outward, they curve axially inboard and follow through the rim section of the wheel structure. These passages are separated by impeller vanes connecting the outer periphery of the rim section with the inner periphery or drum section which is of a greater thickness than the outer section and provides a means for storage of dissipated heat. The impeller vanes conduct the heat to the rim section on the outer periphery of the wheel. The applicant has designed the wheel structure for a tubeless tire thereby providing a mounting section for the tires on tire mounting flanges. One of these flanges may be shrunk fit on the outer periphery of the rim and provided with a sealing means against any leakage of air pressure, the opposite flange carrying an O-ring seal and a snap ring for sealing and mounting of said tire mounting flange.

The inboard side of the radial wall supporting the rim section is provided with fins for creating a turbulence within the inner periphery of the brake drum. The braking structure has an open wall on the inboard side of the vehicle wheel. This open wall provides for ingress and egress of cooling air as the vehicle wheel is rotating.

The wheel structure is mounted on a shaft which extends axially inboard where it is connected to the drive shaft for rotating the wheel. The bearing housing of this shaft provides the mounting surface for the actuating means within the braking structure.

This structure provides for a wheel of a small diameter for supporting a large tire. The inner periphery of the brake drum has greater axial length to provide for increased braking area for the engaging brake shoes. The cooling means is of a structure which operates automatically upon rotation of the vehicle wheels. The radiating surface for the dissipated heat is of sufficient area to provide rapid cooling of the dissipated heat of the brake structure.

Further objects and advantages of the present invention will be apparent from the following description, reference being had to the accompanying drawings wherein preferred embodiments of the present invention are clearly shown.

In the drawings:

FIGURE 1 discloses an end view of the braking structure taken from the outboard side of the vehicle wheel. Portions of the radial wall of the vehicle wheel are broken away to illustrate the radially extending passages from the hub section to the rim section.

FIGURE 2 is a cross-sectional view of the braking structure taken on line 2—2 of FIGURE 1. This view illustrates the passages within the drum portion of the vehicle wheel as well as the radial portion extending to the outboard side of the wheel. The fins are also illustrated on the inboard side of the radial wall of the wheel.

FIGURE 3 is an end view of the vehicle wheel taken from the inboard side of the vehicle wheel. This view illustrates the otulet ports of the passages of the drum section of the wheel. The fins on the inboard side of the radially extending wall are also shown.

Figure 1:
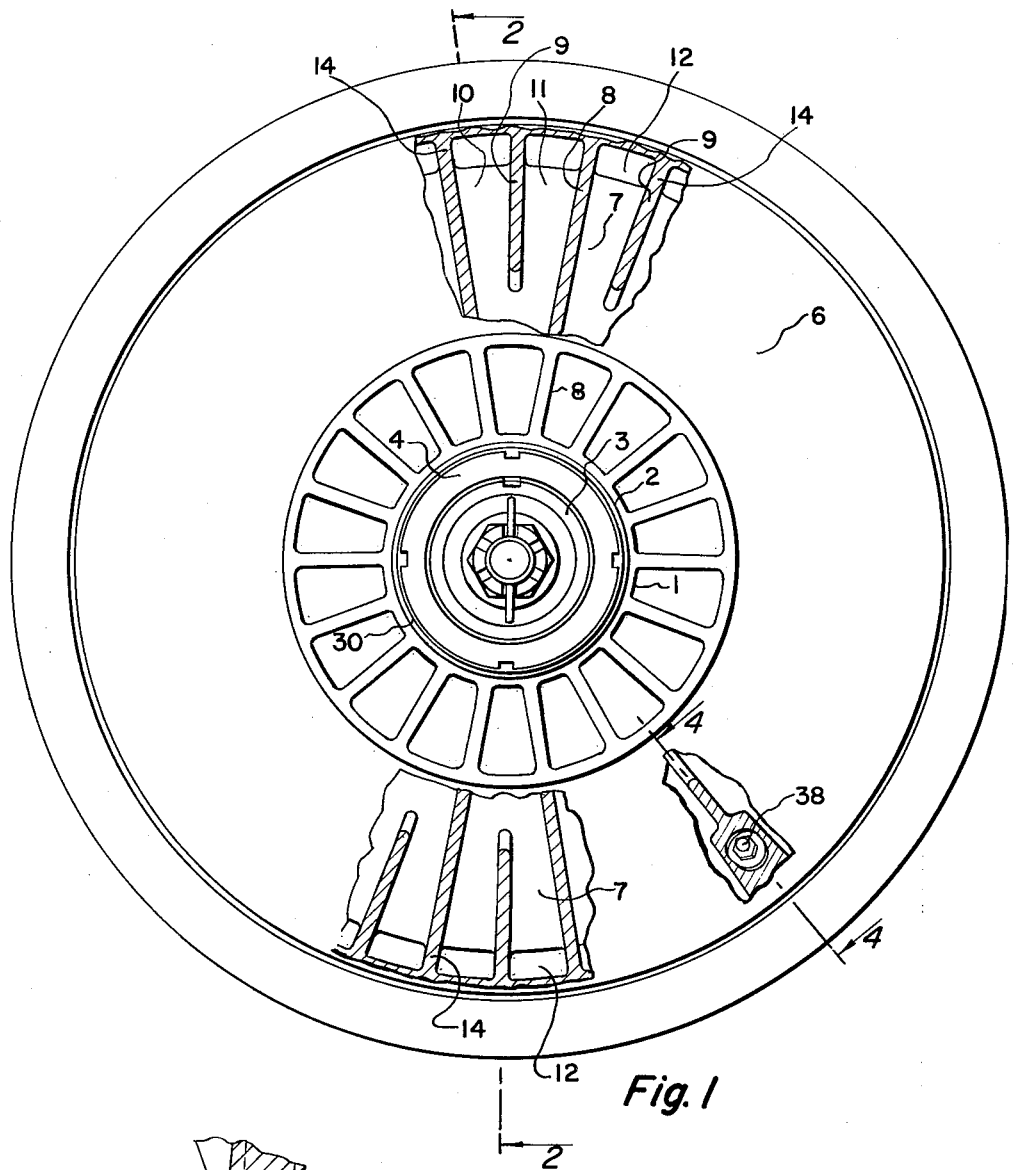

FIGURE 1 illustrates the vehicle wheel structure comprising a unitary casting. The hub section 1 is mounted on a sleeve member 2 which is, in turn, supported by the wheel support 3. This wheel support member is locked in position by nut 4 abutting a washer 5 and locking member 30. The bearing housing 31 and drive shaft 32 are shown within the wheel structure. The brake actuating means is also shown mounted on the bearing housing. The brake actuating structure and mounting means are shown in detail in a copending application of the same assignee, S.N. 763,776 filed September 3, 1958.

The vehicle wheel comprises radial walls 6 and 7 connected by impeller vanes 8 and 9. These walls, combined with the impeller vanes 8 and 9, provide radially extending passages 10 and 11. Alternate impeller vanes 9 do not extend to the radially inner portion of the passage means 10 due to the fact that the impeller vanes converge toward the hub section of the wheel structure. The impeller vanes create force rotation of the air within the radial passages.

Figure 2:
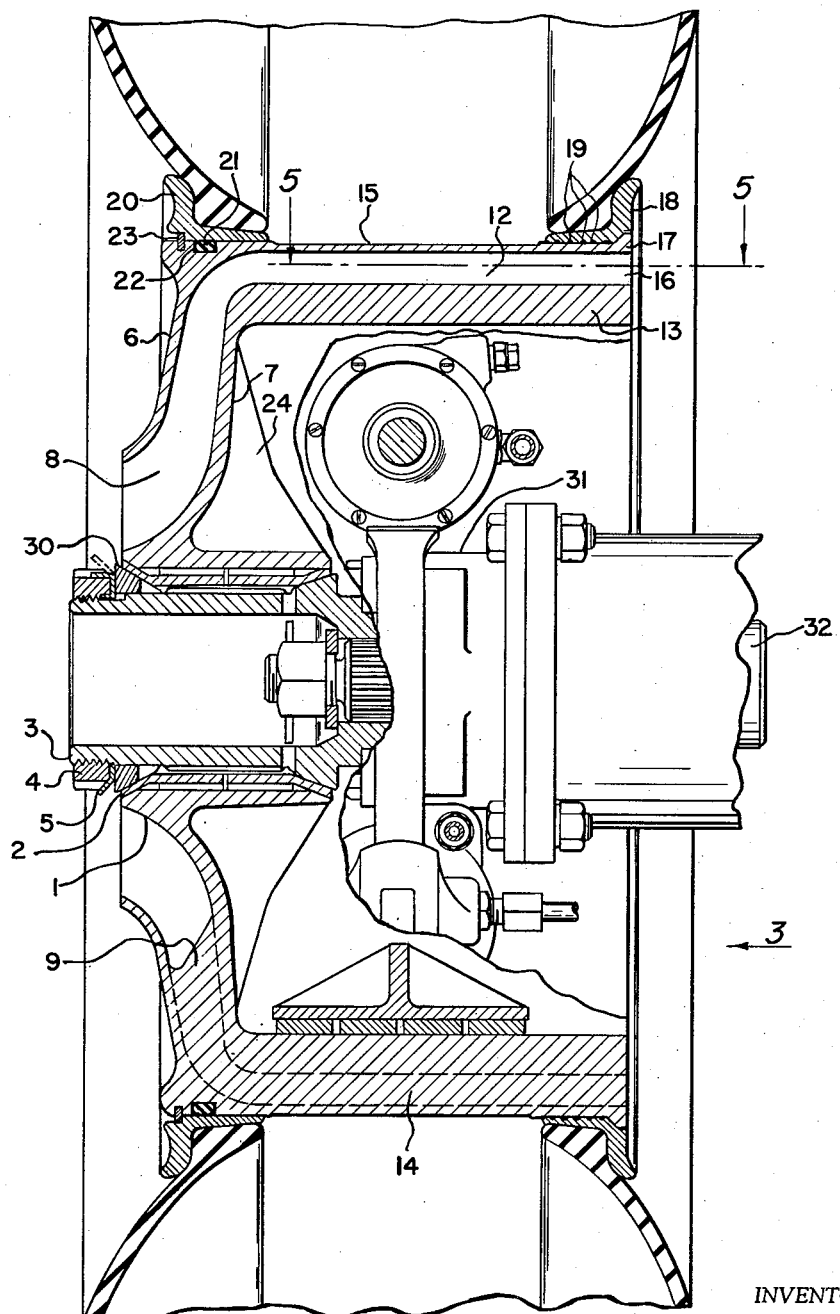

FIGURE 2 illustrates the radial walls 6 and 7 extending radially outward to the drum 13 and rim portions 15 of the wheel structure. These passages curve axially and extend to the inboard side within the rim section of the wheel. The axial passages 12 are formed between the heavier drum portion 13 and the rim portion 15 of the wheel. This heavier portion 13 provides a storage means within the wheel structure for the dissipated heat created on the inner periphery of the brake drum 13. The impeller vanes 8 and 9 extend axially as shown by axial portion 14 of the vanes. The axial portion 14 joins the thicker drum section 13 with the thinner rim section 15 of the wheel structure. The radial wall 7 adjoins the drum 13 and radial wall 6 adjoins the rim portion 15. These walls and vanes form continuous passages from the hub section through the rim portion. The impeller vanes provide for rapid conduction of dissipated heat from the thicker drum 13 to the thinner rim section 15 of the wheel by employing a metal having a high heat capacity per unit weight and also a characteristic high thermal conductivity. The high rate of conductivity maintains a more nearly constant temperature throughout the wheel structure and the heat capacity stores heat momentarily as it is dissipated.

The tire mounting flanges are supported on the radially outer periphery of the rim section of the wheel structure. An annular bead 17 is provided on the outer periphery of the inboard portion of the wheel rim. The tire mounting flange 18 abuts the annular bead 17 and is preferably shrunk fit on the rim section of the wheel. A sealing means 19 is provided between the tire mounting flange and the rim section of the wheel.

Figure 4:
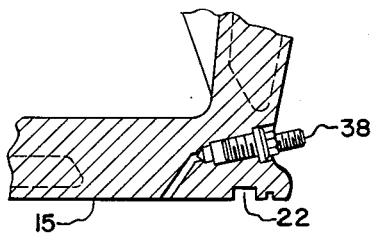
FIGURE 4 is a cross-sectional view taken on line 4—4 of FIGURE 1 illustrating the inflation valve when the wheel structure is used for supporting a tubeless tire.

The outboard tire mounting flange 20 is demountable. An O-ring seal 21 is provided on the outer periphery on the outboard side of the vehicle wheel within the annular groove 22. The tire mounting flange 20 is securely retained in its position by means of a snap ring 23. The applicant does not wish to limit this wheel structure to use solely for a tubeless tire although a tubeless tire would function more advantageously due to the fact that there would be no tube overlying the rim portion of the wheel structure. FIGURE 4 illustrates an inflation valve 38 mounted in the rim section.

Figure 3:
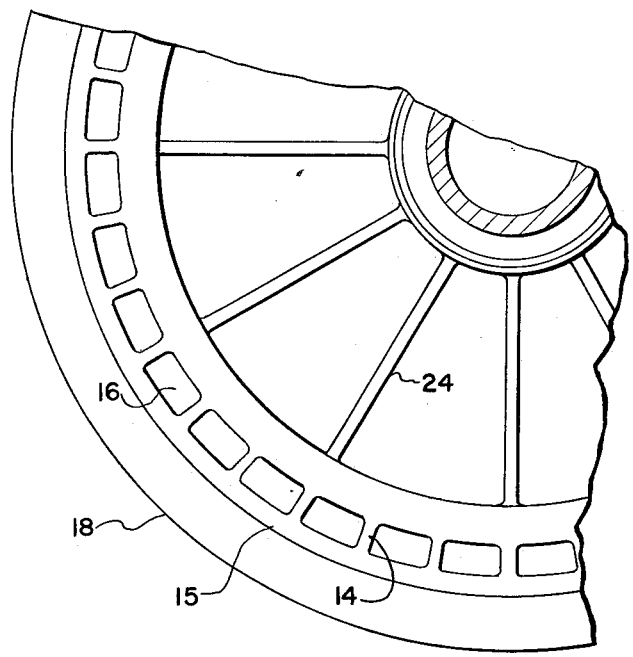

FIGURE 3 illustrates the wheel structure as viewed from a position axially inboard from the wheel. The outlets 16 of passages 12 are shown in the rim section of the wheel. The tire flange 18 is also shown adjoining the outer periphery of the rim section 15. Fins 24 are shown mounted on the inboard side of the radial wall. These fins are also shown as having a somewhat triangular shape as viewed in the cross section of FIGURE 2. The wheel structure is such that the inboard side is open thereby providing ingress and egress of air within the wheel structure, the fins 24 creating a turbulence of air and thereby providing a cooling effect on the brake drum structure. The inner periphery of the drum 13 is preferably treated to produce a hardening for increased wear due to the friction of the brake shoes on the inner periphery.

It is proposed that the wheel structure including the drum and rim section be cast of a light-weight metal such as aluminum or magnesium which would have a high specific heat per unit weight. A metal of this type would also have a high thermal conductivity and thereby provide rapid conduction of the heat to the rim section of the wheel thereby providing a relatively constant temperature throughout the wheel structure. The tire mounting flanges would preferably be made of a metal having a lower rate of heat conductivity such as ordinary steel or stainless steel. By employing a steel on the tire flange, the conductivity of heat to this point of the structure would reduce the heat on the tire contact to avoid a high temperature which may be injurious to the tires.

Figure 5:
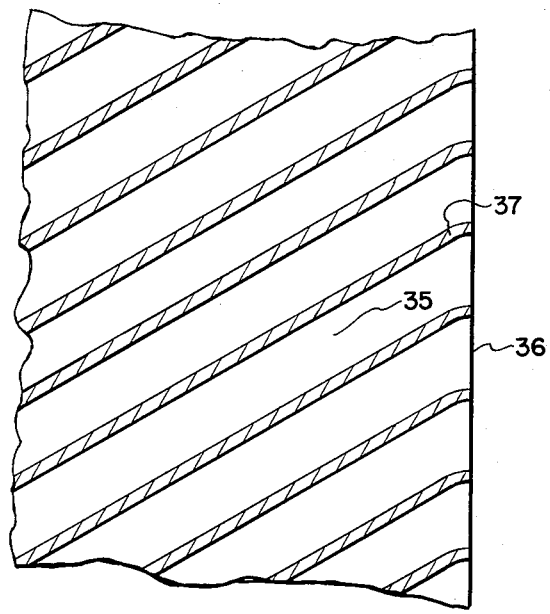
FIGURE 5 illustrates a modified version of the braking structure taken on line 5—5 of FIGURE 2. This view illustrates the passages within the drum section placed at an angle to an axial line of the vehicle wheel.

FIGURE 5 illustrates a modified version of this invention wherein the axial passages 35 within the rim section of the wheel structure are placed at an angular position in relation to the axis of the wheel. The axial portion in the rim section of the wheel adjoins the radial section of the passage means in the same manner as the previously described original version. At the point of exit 36 of these passages 35, a slight curvature may be provided so that the ends of the passages curve to a line parallel with the axis of the wheel structure. By providing the passages which are slightly angular to the axis of the wheel, an increased flow of air would be present during the time of deceleration due to the fact that the air mass forces against the inclined surface of the passage walls thereby creating lateral flow of the air. This structure, however, requires a single direction of rotation of the wheel.

This invention operates in the following manner. As the wheel is rotated, the air contained within the radial passages 10 and 11 is forced outward due to the centrifugal force created on the rotating air mass. The air adjacent to the hub section of the wheel would move inward in the passage thereby drawing air from the outside of the wheel structure. The air moving radially outwardly would force air through the axial passage in the drum section of the wheel. The passage of the air through the aixal portion of the passages would create a cooling effect of the brake drum and the rim section of the wheel.

As the brakes are actuated, the frictional contact of the brake shoes dissipate heat which is absorbed in the thicker drum section 13 of the wheel structure. This thicker drum section 13 operates as a means for storing the dissipated heat temporarily. By utilizing a metal which has a high thermal capacity, considerable heat may be absorbed and stored in this section of the wheel structure. It is also desirable that this metal be of the characteristic which has a high heat conductivity and thereby rapidly conduct the heat through the passage walls 14 in the rim section 15 thereby heating the rim section or the outer periphery of the wheel structure. The passage walls 14 within the rim section and the rim would all have a relatively constant temperature in relation to the thicker drum section. By the circulation caused by the centrifugal pumping action of the radial wall of the wheel section, a rapid passage of air is created through the passages in the rim section. This movement of air picks up heat and carries it to the outlet 16 of these passages 12 on the rim section of the wheel. By a rapid conduction of heat and circulation of the air, the rim section of the wheel is cooled down rapidly thereby preventing any great amount of heat being transferred to the tire flanges and thereby avoiding any damaging high temperatures of the metal contacting the tires.

This type of an air-cooled wheel and brake drum provides for a rapid cooling within the rim section of the wheel. The vanes 24 are also provided on the inner side of the radial wall to cause turbulence of the air within the brake drum at all times when the wheel is rotating. This turbulence provides a cooling effect on the brake shoes as well as the inner periphery of the brake drum for any heat that may be dissipated within the brake actuating means of the brake structure. It is noted that this type of a wheel structure is very compact due to the fact that the brake drum and the rim section of the wheel are cast in an integral structure. The cooling caused within the braking structure is automatic and is operating at all times when the vehicle wheels are in rotation.

The modification in this invention illustrates rim passages 35 inclined to an axial line. The passage walls have a curvature 37 where they join the exit port 36 of the passages. This provides for axial movement of the air stream as it leaves the passages. As the velocity of wheel rotation decreases during braking, the centrifugal pumping action within the radial wall also decreases. The rotating air mass within the passages 35 is forced against the inclined passage walls and moves laterally. The combined action of the centrifugal pump and the inclined lateral walls on the air mass during deceleration provides for rapid air movement during braking of the wheels.

While the embodiments of the present invention as herein described constitute preferred forms, it is to be understood that other forms might be adopted.

What is claimed is as follows:

1. A one-piece cast vehicle wheel and brake drum comprising, a hub, a first radial wall extending from said hub terminating in an annular axially extending wall forming a drum, a plurality of radially disposed fins spaced about the inboard side of said radial wall connecting the wall with the hub, a second radial wall in spaced relation to said first radial wall terminating in an annular axially extending wall forming a rim disposed in spaced relationship to said drum wall, and annularly spaced radially disposed vanes between said first and second radial walls and extending continuously between said drum wall and said rim wall and connectively securing together said rim wall on said drum wall and said radial walls, said vanes forming with said radial walls radial passages and with said rim and drum axial passages as continuations of said radial passages to operate as a centrifugal pump providing continuous passage means from the hub section of said wheel to the opposite side of the wheel coextensive with the said walls and with the drum and rim for continuous circulation of air through the wheel when the wheel is in rotation.

2. A one-piece cast vehicle wheel constructed and arranged in accordance with the structure set forth in claim 1 wherein said drum wall is substantially greater in radial thickness than said rim wall to provide thereby for temporary heat storage during a brake application.

3. A one-piece cast vehicle wheel and brake drum comprising, a hub, a first radial wall having an inner peripheral end at said hub with the wall extending from the outboard end of said hub and terminating in an annularly axially extending wall forming a drum, a plurality of radially disposed fins spaced about the inboard side of said first radial wall connecting the wall with the hub, a second radial wall having an inner peripheral end spaced radially from the inner peripheral end of said first wall with the said second wall in spaced relation to said first radial wall and terminating in an annular axially extending wall forming a rim disposed in spaced relationship to said drum wall, and annularly spaced radially disposed vanes between said first and second radial walls extending from the said peripheral ends thereof continuously therebetween and between said drum wall and said rim wall and connectively securing together said rim wall on said drum wall and said radial walls, said vanes forming with said radial walls radial passages and with said rim and drum axial passages as continuations of said radial passges to operate as a centrifugal pump providing continuous passage means from the hub section of said wheel to the opposite side of the wheel coextensive with the said walls and with the drum and rim for continuous circulation of air through the wheel when the wheel is in rotation.

References Cited in the file of this patent

UNITED STATES PATENTS

| | | |
|---|---|---|
| 1,847,319 | Wentworth | Mar. 1, 1932 |
| 1,894,238 | Musselman | Jan. 10, 1933 |
| 1,906,737 | Burgess | May 2, 1933 |
| 1,912,789 | Norton | June 6, 1933 |
| 1,957,654 | La Brie | May 8, 1934 |
| 1,966,169 | Forbes | July 18, 1934 |
| 1,974,534 | Frank | Sept. 25, 1934 |
| 2,265,938 | Eksergian | Dec. 9, 1941 |
| 2,274,503 | Reid | Feb. 24, 1942 |
| 2,808,870 | Riggs | Oct. 8, 1957 |
| 2,842,377 | Ronning | July 8, 1958 |

FOREIGN PATENTS

| | | |
|---|---|---|
| 776,644 | France | Nov. 8, 1934 |
| 779,937 | France | Jan. 24, 1935 |
| 637,892 | Germany | Nov. 5, 1936 |